(12) United States Patent
Ghadar et al.

(10) Patent No.: US 11,127,074 B2
(45) Date of Patent: Sep. 21, 2021

(54) RECOMMENDATIONS BASED ON OBJECT DETECTED IN AN IMAGE

(71) Applicant: A9.com, Inc., Palo Alto, CA (US)

(72) Inventors: Shabnam Ghadar, Sunnyvale, CA (US); Shruthi R. Bathina, Sunnyvale, CA (US); Sharmila Nagaraja Reddy, Fremont, CA (US); Natasha Duggal, Hyderabad (IN); Aishwarya Natesh, Mountain View, CA (US); Andrea Zehr, Palo Alto, CA (US); Pinkee Rasik Patel Gupta, San Mateo, CA (US)

(73) Assignee: A9.com, Inc., Palo Alto, CA (US)

( * ) Notice: Subject to any disclaimer, the term of this patent is extended or adjusted under 35 U.S.C. 154(b) by 424 days.

(21) Appl. No.: 15/926,510

(22) Filed: Mar. 20, 2018

(65) Prior Publication Data

US 2019/0295151 A1 Sep. 26, 2019

(51) Int. Cl.
*G06Q 30/06* (2012.01)
*G06T 19/00* (2011.01)
(Continued)

(52) U.S. Cl.
CPC ....... *G06Q 30/0643* (2013.01); *G06F 16/434* (2019.01); *G06F 16/5854* (2019.01);
(Continued)

(58) Field of Classification Search
CPC ......... G06Q 30/00–08; G06Q 30/0643; G06Q 30/0631; G06Q 30/0603; G06F 16/90328;
(Continued)

(56) References Cited

U.S. PATENT DOCUMENTS 9,424,461 B1 * 8/2016 Yuan ................. G06K 9/00214
10,332,188 B2 * 6/2019 Bhardwaj ............... G06K 9/20
(Continued)

OTHER PUBLICATIONS

Novel feature representation and *matching techniques for content-based image retrieval Wang, Zhiyong. Hong Kong Polytechnic University (Hong Kong), ProQuest Dissertations Publishing, 2003. 3107453. (Year: 2003).*

(Continued)

*Primary Examiner* — Michael Misiaszek
(74) *Attorney, Agent, or Firm* — Hogan Lovells US LLP

(57) ABSTRACT

Various embodiments provide for recommending products from an electronic catalog that are aesthetically compatible with an existing item in a physical space based on a live camera view of the space, and rendering augmented reality views of the recommended products into the live camera view. Specifically, an image of the existing item is used to search a database of images of designed spaces that includes a corresponding object visually similar to the existing item. The image of the designed space may also include other items that are visually compatible with the corresponding object and therefore visually compatible with the existing item. Thus, the images of the other items are used to search an electronic catalog for available items that are visually similar to the other items and therefore would be visually compatible with the existing item.

20 Claims, 9 Drawing Sheets

(51) Int. Cl.
*G06F 16/9038* (2019.01)
*G06F 16/9032* (2019.01)
*G06F 16/908* (2019.01)
*G06F 16/583* (2019.01)
*G06F 16/432* (2019.01)

(52) U.S. Cl.
CPC ........ *G06F 16/908* (2019.01); *G06F 16/9038* (2019.01); *G06F 16/90328* (2019.01); *G06Q 30/0603* (2013.01); *G06Q 30/0631* (2013.01); *G06T 19/006* (2013.01)

(58) Field of Classification Search
CPC .. G06F 16/908; G06F 16/5854; G06F 16/434; G06F 16/9038; G06T 19/006; G06T 2200/24; G06T 2210/04
See application file for complete search history.

(56) References Cited

U.S. PATENT DOCUMENTS

| | | | | |
|---|---|---|---|---|
| 2010/0325015 | A1* | 12/2010 | Westphal | G06Q 30/02 705/26.7 |
| 2012/0095862 | A1* | 4/2012 | Schiff | G06Q 30/0282 705/26.7 |
| 2012/0231424 | A1* | 9/2012 | Calman | G09B 25/04 434/72 |
| 2013/0259308 | A1* | 10/2013 | Klusza | G06F 30/13 382/103 |
| 2015/0363943 | A1* | 12/2015 | Yalniz | G06T 7/90 345/591 |
| 2018/0260843 | A1* | 9/2018 | Hiranandani | G06Q 30/0255 |
| 2019/0205965 | A1* | 7/2019 | Li | G06Q 30/0631 |
| 2019/0355046 | A1* | 11/2019 | Walti | G06Q 30/0631 |

OTHER PUBLICATIONS

Hutch, the virtual interior design app, has raised $10M from Zillow Tepper, Fitz. TechCrunch, New York: AOL Inc. Jul. 12, 2017. (Year: 2017).*
Interior design business expands. Roccapriore, Carla . Reno Gazette—Journal ; Reno, Nev. [Reno, Nev]Jan. 3, 2008: C.1. Retrieved via ProQuest (Year: 2008).*
CSL Launches Clever Interior Design App. Publication info: PR Newswire ; New York [New York]May 3, 2012. Retrieved via ProQuest. (Year: 2012).*
International Search Report and Written Opinion issued in PCT Application No. PCT/US19/23093, dated May 24, 2019.
International Preliminary Report on Patentability issued in PCT Application No. PCT/US19/23093, dated Sep. 22, 2020.
Tautkute Ivona et al: "What looks good with my sofa: Multimodal search engine for interior design", 2017 Federated Conference on Computer Science and Information Systems ( FEDCSIS). Polish Information Processing Society (PIPS). Sep. 3, 2017 (Sep. 3, 2017), pp. 1275-1282, XP033252403, DOI: 10.15439/2017F56 [retrieved on Nov. 10, 2017] the whole document.
Hiranandani Gaurush et al: "[Poster] Enhanced Personalized Targeting Using Augmented Reality", 2017 IEEE International Symposium on Mixed and Augmented Reality (ISMAR-Adjunct), IEEE, Oct. 9, 2017 (Oct. 9, 2017), pp. 69-74, XP033242529, DOI: 10.1109/ISMAR-ADJUNCT.2017.34 [retrieved on Oct. 27, 2017] the whole document.

* cited by examiner

RECOMMENDATIONS BASED ON OBJECT DETECTED IN AN IMAGE

BACKGROUND

Users are increasingly utilizing electronic devices to research, locate, and obtain various types of information. For example, users may utilize a search engine to locate information about various items, such as furniture or other home-related items offered through an electronic marketplace. A benefit of such electronic marketplaces is the ability to provide user with large selections of items to choose from. However, this benefit can also provide various challenges. For example, it may be difficult for users to navigate through such a large selection of items, often resulting in fatigue or indecision. Additionally, a key decision factor in purchasing furniture or decor item is aesthetics. Not only is it important for users to know what an individual item looks like, but also whether an item would look good in a certain room or with an existing item in the room. For example, some users may want to add some additional items to a room but may not know what types of items would look good in the space and/or with their existing furniture.

BRIEF DESCRIPTION OF THE DRAWINGS

Various embodiments in accordance with the present disclosure will be described with reference to the drawings, in which.

DETAILED DESCRIPTION

Figure 1:
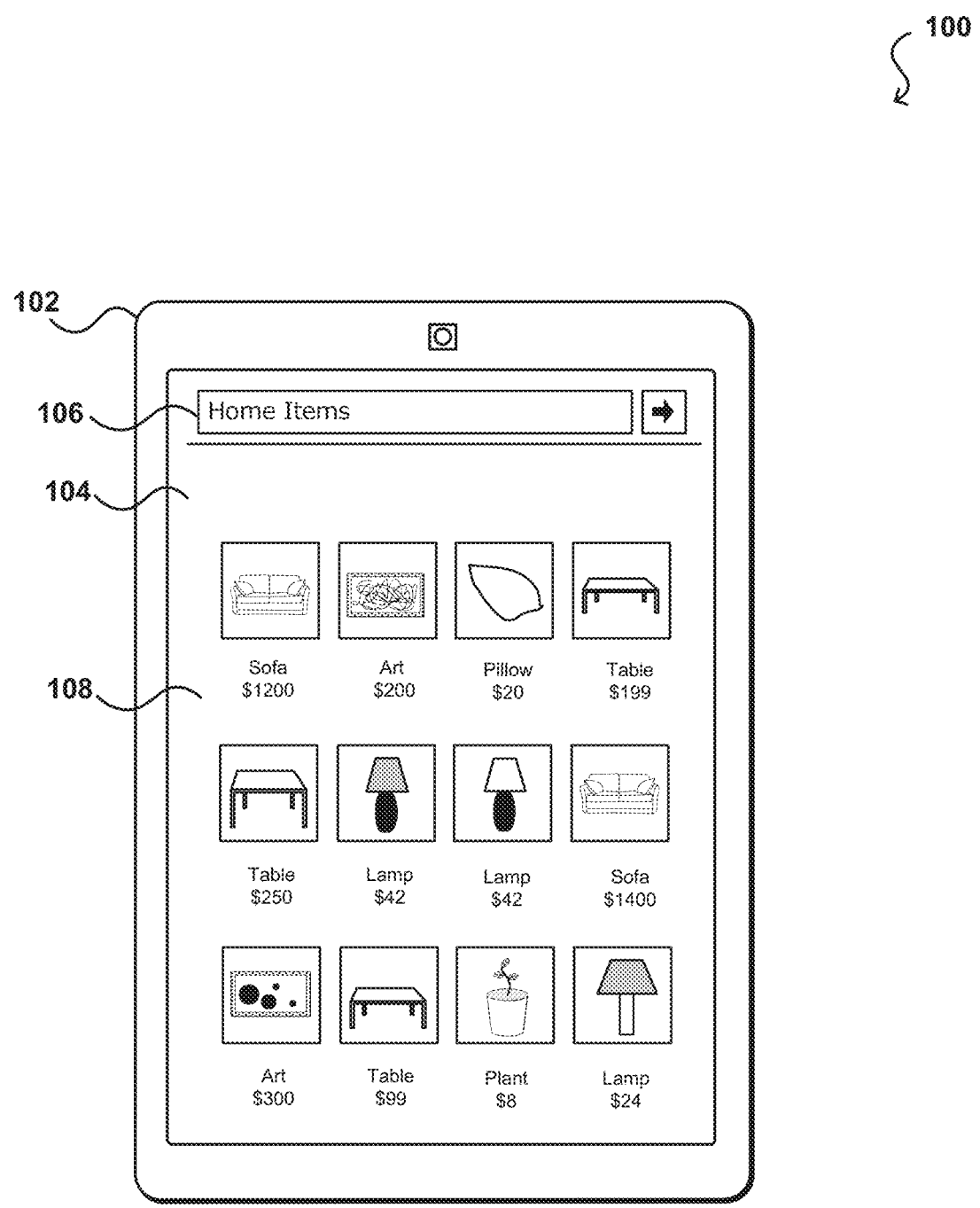
FIG. 1 illustrates an example computing device providing access to an electronic marketplace.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches for visual search and recommendation systems. In particular, various embodiments provide for recommending products from an electronic catalog that are aesthetically compatible with an existing items in a physical space based on a live camera view of the space, and rendering augmented reality views of the recommended products into the live camera view.

For example, a user would like to search an electronic catalog for items that would look good in a certain room (e.g., living room, bedroom, office) or with a piece of furniture (e.g., sofa, table, bed) in the room. Thus, the user can use a device with a display and a camera, such as a smartphone or tablet, to capture a live camera view of the room, including the piece of furniture. A recommendation system having access to the electronic catalog may receive a query from the user device (i.e., client device) which includes image data from the live camera view. The piece of furniture in the live camera view may be detected as a query object in the image data. Thus, a representation of the query object, such as a feature vector, is determined and used to search a database of example sets of compatible objects.

In some embodiments, the sets of compatible items are determined from images of designed rooms having a plurality of items that are compatible with each other (e.g, look good together) accordingly to at least some aesthetic taste. In some embodiments, in order to generate the database of example sets of compatible objects, a plurality of images are analyzed, with each image being associated with one example set of compatible objects. Specifically, in analyzing one such image, a plurality of relevant objects in the image are detected using an object detection technique and respective feature vectors of the plurality of relevant objects are determined. In some embodiments, the relevant objects may include furniture and decor items such as sofas, tables, beds, TV stands, coffee tables, throw pillows, vases, end tables, chairs, blankets, lamps, decorative objects, wall art, among many others. In other applications of the present techniques, the relevant objects may be different types of objects, such as fashion items, outdoor items, art, among others. For example, the present techniques may be used to recommend fashion items, such as clothes, accessories, shoes, and the like, that go well with a certain query item, such as a certain shirt that the user already owns.

Thus, the example sets of compatible objects are defined by respective feature vectors describing the each object in the set, as described above. The database is searched to identify an example set that includes an object having a similar feature vector as the query object, which means that the example set includes a corresponding object visually similar to the query object. In some embodiments, the measure of similarity is determined using a K-Nearest Neighbor technique with euclidean distance. Since the other objects in the identified example set of objects are known to be considered aesthetically compatible with the corresponding, these other objects are likely to be aesthetically compatible with the query object and can be used to recommend items to the user are compatible with the query objects. Specifically, the other objects in the identified example set are used to search the electronic catalog for items that are visually similar. In some embodiments, feature vectors of the items in the electronic catalog, or in certain product categories of the electronic catalog, are compared to feature vectors of the other objects in the identified example set, and the visually similar items are determined based on a metric such as euclidean distance. Thus, the items can be provided to the user as recommended products that may be aesthetically compatible with their query object.

In various embodiments, other factors may be used in determining the recommended products. For example, a user may provide a user input such as selecting a style preferences. The user may be presented with a plurality of style options (e.g., modern, traditional, minimalist, mid-century, bohemian) and the user selects one of the style options as their style preference. Thus, the style preference is also used in determining the recommended products. In various embodiments, when the recommended products, or other products, are presented to the user, the user may be given the option to interact with the product, such as like clicking into a details page, selecting a "like" input, selecting "dislike" input, adding the product to their electronic shopping cart, saving the product, among others. Such actions taken by the user generate user interaction data, which provides insight into the user's feedback or sentiment towards the product. This user interaction data can also be used in determining the recommended products.

In some embodiments, one or more similarity-based candidate items can be determined based at least in part on the above-mentioned identified example set of compatible items, one or more style-based candidate items can be determined based at least in part on the style preference, and one or more interaction-based candidate items can be determined based at least in part on the user interaction data. Respective feature vectors associated with the similarity-based candidate items, the style-based candidate items, and the interaction-based candidate items can all be determined, and respective weights can be applied to each of the feature vectors belonging to each group. For example, a first weight value can be applied to all the similarity-based feature vectors, a second weight value can be applied to all the style-based feature vectors, and a third weight value can be applied to all the interaction-based feature vectors. A resultant feature vector can then be generated from a weighted combination of the feature vectors, based on the assigned weights; and the electronic catalog can be searched to find items that have feature vectors similar to the resultant feature vector. In some embodiments, the weights applied to the different groups of feature vectors can be determined through AB testing, optimizing for user engagement such as sales. Specifically, this may include applying a plurality of different sets of weights to the feature vectors, obtaining respective sales data associated with the plurality of different sets of weights, and determine an optimal set of weights based at least in part on the sales data.

Various other features and application can be implemented based on, and thus practice, the above described technology and presently disclosed techniques. Various other applications, processes, and uses are presented below with respect to the various embodiments, each of which improves the operation and performance of the computing device(s) on which they are implemented.

FIG. 1 illustrates an example 100 computing device 102 providing access to an electronic marketplace 104, in accordance with various embodiments. In this example, a computing device 102 provides access to an electronic marketplace 104, in accordance with various embodiments. Although a tablet computing device is shown in this example, it should be understood that various other types of electronic devices that are capable of determining and processing input and providing output can be used in accordance with various embodiments discussed herein. These devices can include, for example, smart phones, e-book readers, desktop computers, notebook computers, personal data assistants, video gaming consoles or controllers, smart televisions, and portable media players, wearable computers (e.g., glasses, watches, etc.) among others. Further, the elements illustrated can be part of a single device, while at least some elements illustrated and otherwise utilized for such a device can be provided as one or more peripheral devices or accessories within the scope of the various embodiments.

Figure 2A:
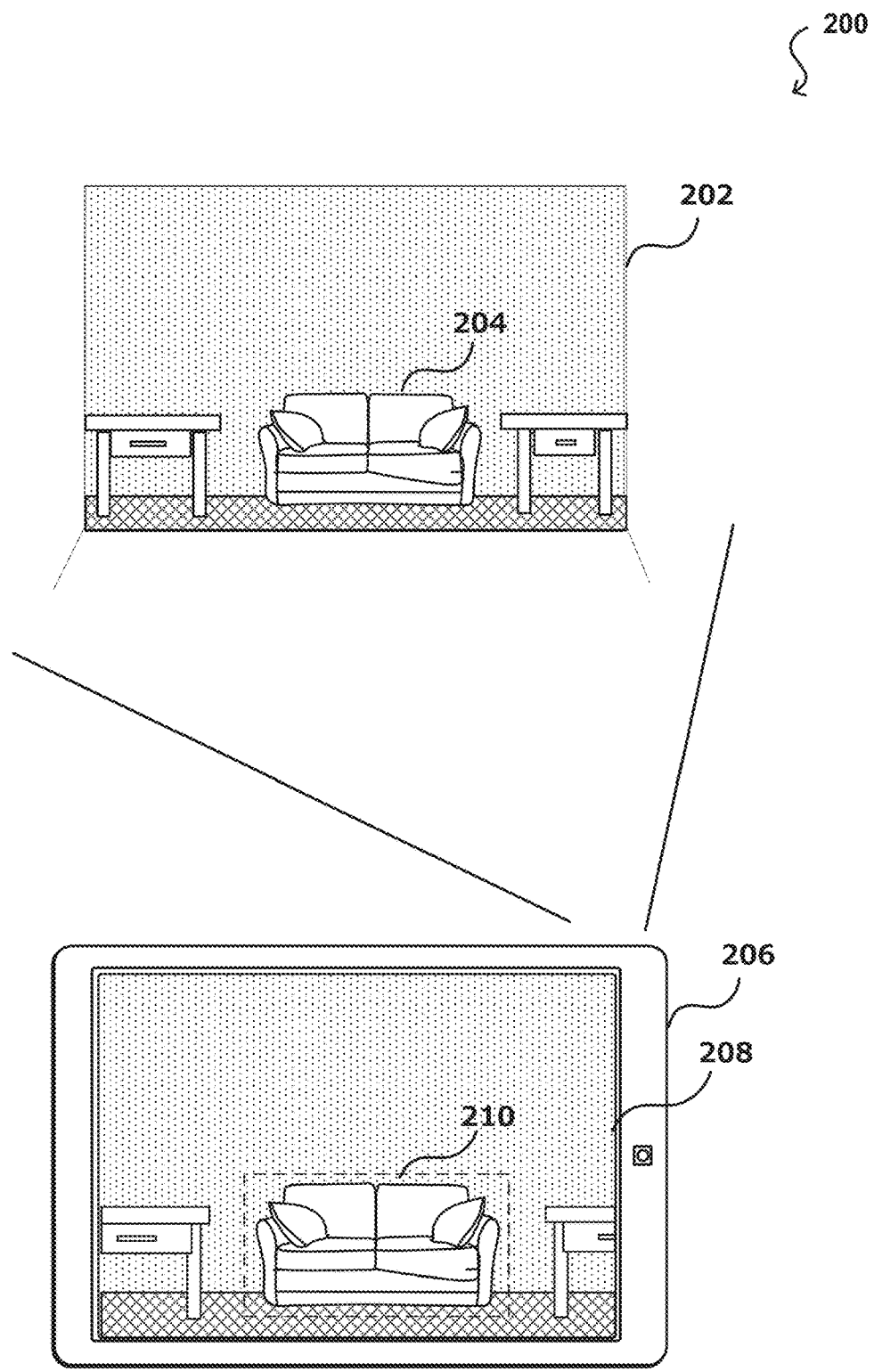
FIG. 2A illustrates an example interface for capturing image data of a physical space, in accordance with various embodiments of the present disclosure.

FIG. 2A illustrates an example scenario for capturing image data of a physical space, in accordance with various embodiments. For example, a user would like to search an electronic catalog for items that would look good in a certain room (e.g., living room, bedroom, office) or with a piece of furniture (e.g., sofa, table, bed) in the room. Thus, the user can use a device with a display and a camera, such as a smartphone or tablet, to capture a live camera view of the room, including the piece of furniture. In this example, a user device 206 is used to capture image data of a physical space 202 or scene including a particular object of interest 204. The image data may be from a live camera view or a captured still image. The mobile computing device 206 may include or be communicatively coupled to a camera capturing the image data. The image data is being displayed on a screen 208 of the computing device 206; for example, a real-time or near-real-time rendering of the image data being captured by the camera, which in this example would be of the physical space including the object of interest 204. Although a portable computing device 206 (e.g., a smart phone or tablet computer) is shown, it should be understood that various other types of electronic devices that are capable of determining and processing input can be used as well in accordance with various embodiments. These devices can include, for example, notebook computers, personal data assistants, e-book readers, cellular phones, video gaming consoles or controllers, smart televisions, set top boxes, a wearable computer (e.g., a smart watch or glasses), and portable media players, among others.

Figure 2B:
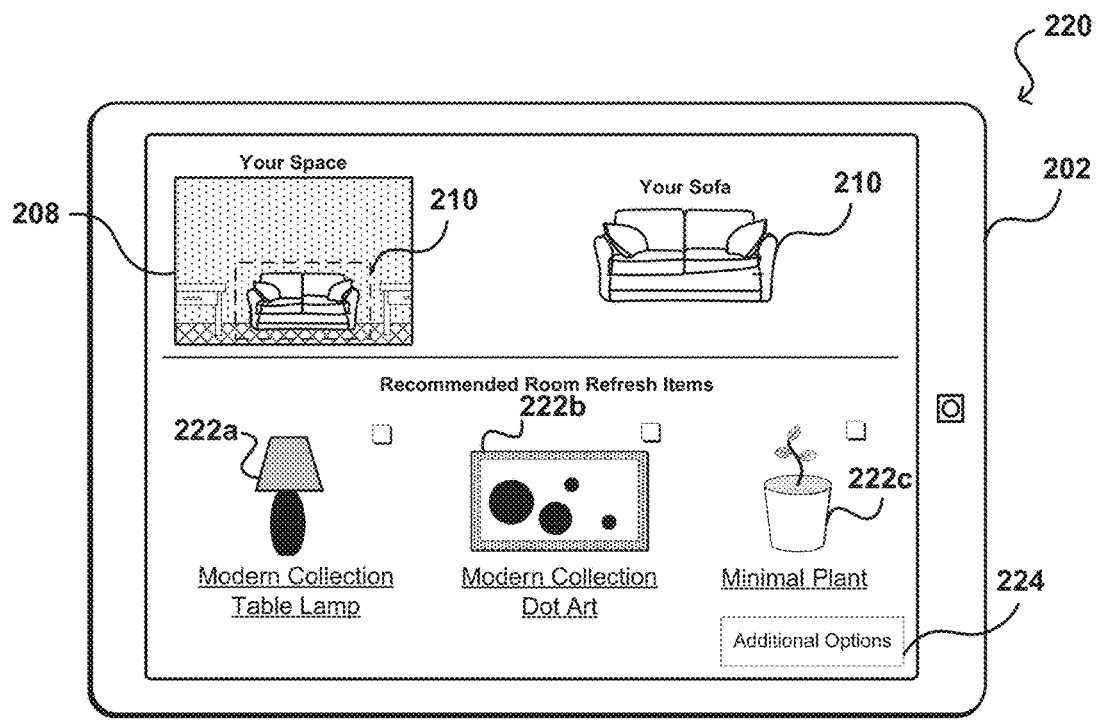
FIG. 2B illustrates an example interface for providing recommended items based on the image data, in accordance with various embodiments of the present disclosure.

FIG. 2B illustrates an example interface 220 of a user device 202 for providing recommended items 222a, 222b, 222c based on the image data 208 of the query object 210, in accordance with various embodiments. The recommended items 222a 222b, 222c may be items selected from a database such as an electronic catalog. The recommended items 222a 222b, 222c may be selected based on the visual attributes of the query object 210 such as to be visually compatible with the query object, as further described in FIG. 3. In some embodiments, the recommended items 222a, 222b, 222c may be displayed on a display of the user device 202. In some embodiments, the recommended items 222a, 222b, 222c may have an image and/or a link to the product page, and a selector input prompt (e.g., checkbox) that allows the user to for example, put the items on a list for saving, purchasing, keeping as a recommended item, removing from the recommended items, and the like. Users may interact with the recommended items 222a, 222b, 222c, such as by clicking on the respective links, checking the checkbox, and other types of input not shown, such as selecting a "like" input, selecting "dislike" input, adding the product to their electronic shopping cart, saving the product, among others. Such actions taken by the user generate user interaction data, which provides insight into the user's feedback or sentiment towards the product. This user interaction data can also be used in determining the recommended products. In some embodiments, an interface element, such as an "additional options" button, may be provided, which when selected, replaces at least a subset of the presently shown recommended item with alternative recommended items. In some embodiments, a large set of recommended items may be available and a subset are shown at a time. For example, a user may select to keep the lamp 222a by selecting the checkbox associated with the lamp 222a. The use may then click the "additional options" button, and the painting 222b and plant 222c may be replaced with two other recommended items.

Figure 2C:
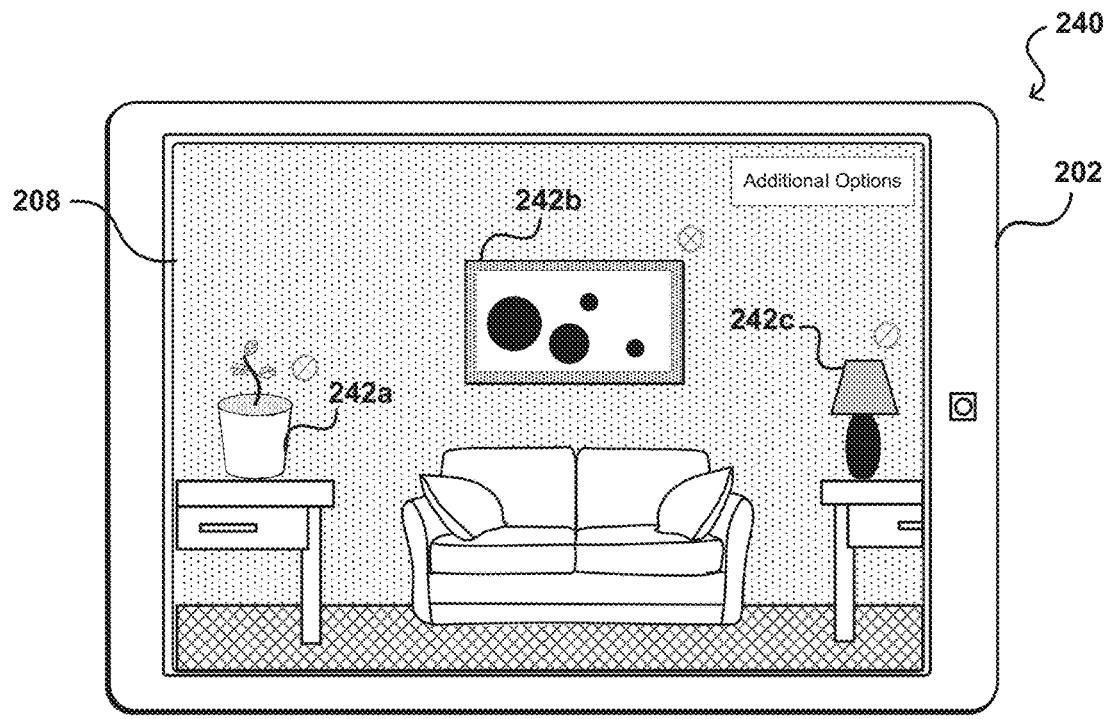
FIG. 2C illustrates an example interface for providing augmented reality renderings of the recommended items, in accordance with various embodiments of the present disclosure.

FIG. 2C illustrates an example interface 240 for providing augmented reality renderings of the recommended items 242a, 242b, 242c, in accordance with various embodiments. In some embodiments, the augmented reality renderings of the recommended items 242a, 242b, 242c may be overlayed on or superimposed onto a live camera view of the physical space, thus providing the visual of the recommended items as a part of the physical space. In some embodiments, the user may interact with the augmented reality renderings of the recommend items 242a, 242b, 242c, such as by clicking on them, which may bring up some product details. The user may remove a certain rendering by clicking on an "x" associated with the rendering. These and other types of interactions may cause different items to be recommended in the future.

Figure 3:
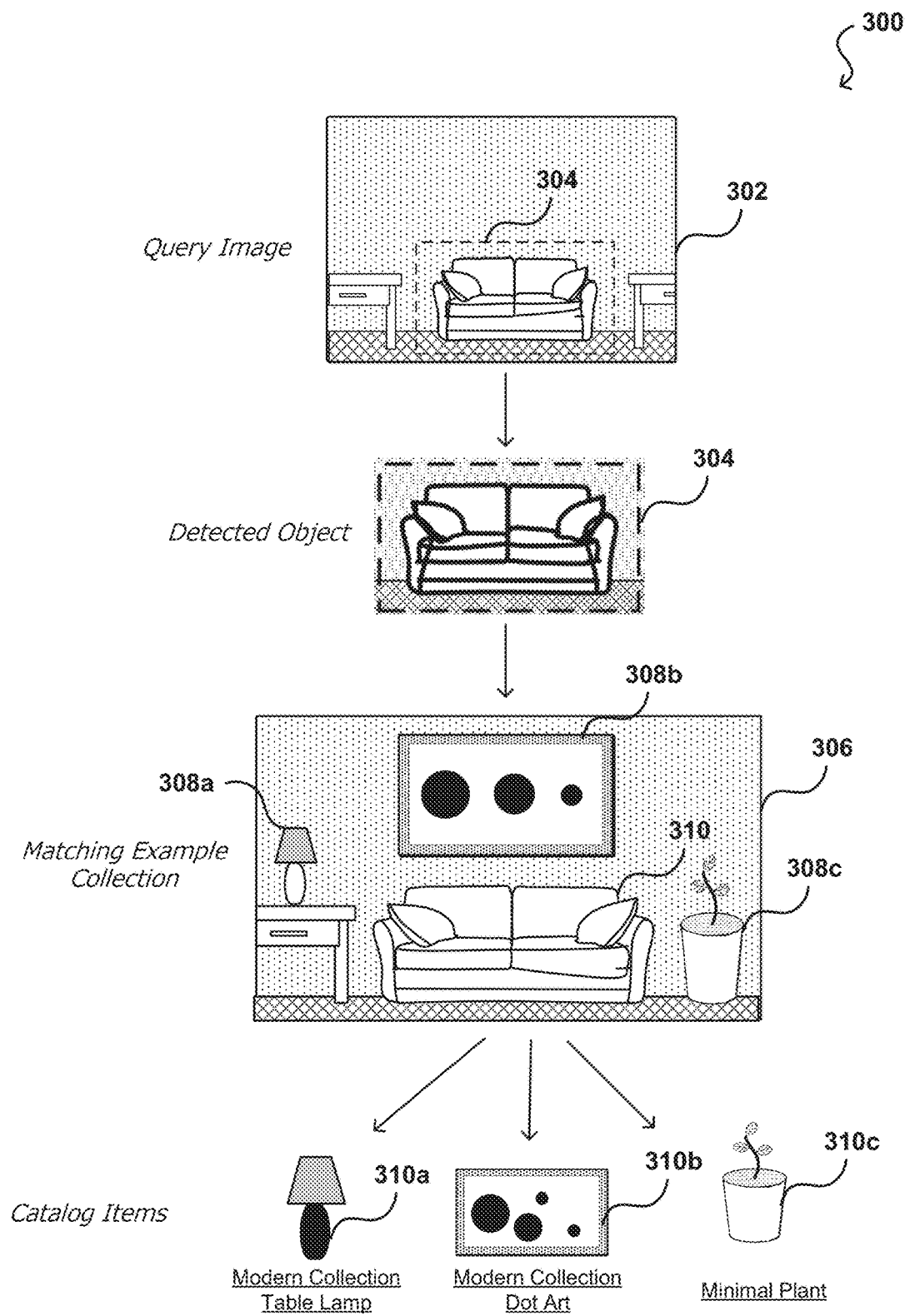
FIG. 3 illustrates an example representation of a process of determining recommended items, in accordance with various embodiments of the present disclosure.

FIG. 3 illustrates an example representation of a process of determining recommended items, in accordance with various embodiments. For example, a user would like to search a electronic catalog for items that would look good in a certain room (e.g., living room, bedroom, office) or with a piece of furniture (e.g., sofa, table, bed) in the room. Thus, the user can use a device with a display and a camera, such as a smartphone or tablet, to capture a live camera view of the room, including the piece of furniture. A recommendation system having access to the electronic catalog may receive a query from the user device (i.e., client device) which includes image data from the live camera view. The piece of furniture in the live camera view may be detected as a query object 304 in a query image 302. Thus, a representation of the query object, such as a feature vector, is determined and used to search a database of example sets of compatible objects. In some embodiments, instead of capturing an image or live camera view using the user device, the user may select an existing image or catalog item as the query object and submit a query for recommended items that go well with the query object.

In some embodiments, the example sets of compatible items are determined from images of designed rooms having a plurality of items that are compatible with each other (e.g, look good together) according to at least some aesthetic taste, such as provided by designers, user, publications, and the like. In some embodiments, in order to generate the database of example sets of compatible objects, a plurality of images, such as those of styled rooms, are analyzed, with each image being associated with one example set of compatible objects. Specifically, in analyzing one such image, a plurality of relevant objects in the image are detected using an object detection technique and respective feature vectors of the plurality of relevant objects are determined. In some embodiments, the relevant objects may include furniture and decor items such as sofas, tables, beds, TV stands, coffee tables, throw pillows, vases, end tables, chairs, blankets, lamps, decorative objects, wall art, among many others. In other applications of the present techniques, the relevant objects may be different types of objects, such as fashion items, outdoor items, art, among others. Thus, the example sets of compatible objects are defined by respective feature vectors describing the each object in the set, as described above.

The database is searched to identify an example set of compatible items 308a, 308b, 308c, 310 from an image of a styled room 306 that includes a corresponding object 312 having a similar feature vector as the query object 304, which means that the example set includes a corresponding object visually similar to the query object 304. In some embodiments, the measure of similarity is determined using a K-Nearest Neighbor technique with euclidean distance. Since the other objects 308a, 308b, 308c in the identified example set of objects are known to be considered aesthetically compatible with the corresponding, these other objects 308a, 308b, 308c are likely to be aesthetically compatible with the query object 304 and can be used to recommend items to the user are compatible with the query objects. Specifically, the other compatible objects 308a, 308b, 308c in the identified example set are used to search the electronic catalog for items that are visually similar. In some embodiments, feature vectors of the items in the electronic catalog, or in certain product categories of the electronic catalog, are compared to feature vectors of the other objects 308a, 308b, 308c in the identified example set, and the visually similar items 310a, 310b, 310c are determined based on a metric such as euclidean distance. Thus, the items can be provided to the user as recommended products 310a, 310b, 310c that may be aesthetically compatible with their query object. In some embodiments, the items selected from the electronic catalog as recommended products 310a, 310b, 310c may correspond to the same item categories as the compatible objects 308a, 308b, 308c, as shown. In some embodiments, the recommended products belong to different item categories than the compatible objects 308a, 308b, 308c in the image of the styled room 306. For example, a vase may be recommended based on a lamp in a styled room, or a coffee table may be recommended based on a TV stand in a styled room. The recommended items may share visual attributes with the respective items in the styled rooms regardless of item category. Thus, for example, a user may select to receive a recommendation for a vase that is visually compatible with the query object, even if the styled room does not include a vase.

In various embodiments, other factors may be used in determining the recommended products. For example, a user may provide a user input such as selecting a style preference. The user may be presented with a plurality of style options (e.g., modern, traditional, minimalist, mid-century, bohemian) and the user selects one of the style options as their style preference. Thus, the style preference is also used in determining the recommended products. In various embodiments, when the recommended products, or other products, are presented to the user, the user may be given the option to interact with the product, such as like clicking into a details page, selecting a "like" input, selecting "dislike" input, adding the product to their electronic shopping cart, saving the product, among others. Such actions taken by the user generate user interaction data, which provides insight into the user's feedback or sentiment towards the product. This user interaction data can also be used in determining the recommended products. In some embodiments, one or more similarity-based candidate items can be determined based at least in part on the above-mentioned identified example set of compatible items, one or more style-based candidate items can be determined based at least in part on the style preference, and one or more interaction-based candidate items can be determined based at least in part on the user interaction data. Respective feature vectors associated with the similarity-based candidate items, the style-based candidate items, and the interaction-based candidate items can all be determined, and respective weights can be applied to each of the feature vectors belonging to each group. For example, a first weight value can be applied to all the similarity-based feature vectors, a second weight value can be applied to all the style-based feature vectors, and a third weight value can be applied to all the interaction-based feature vectors.

A resultant feature vector can then be generated from a weighted combination of the feature vectors, based on the assigned weights; and the electronic catalog can be searched to find items that have feature vectors similar to the resultant feature vector. In some embodiments, the weights applied to the different groups of feature vectors can be determined through AB testing, optimizing for user engagement such as sales. Specifically, this may include applying a plurality of different sets of weights to the feature vectors, obtaining respective sales data associated with the plurality of different sets of weights, and determine an optimal set of weights based at least in part on the sales data.

In various embodiments, a recommended item can be determined based on data of positive and negative pairs of items with respect to one or more of the above-described factors, including similarity, style, and interaction. For example, for the similarity factor, the data may include one or more similarity-based pairs of items in which one item in the pair is identified as being positively associated with the query object as determined using the image of the styled room and the other item in the pair is identified as being negatively associated with the query object as determined using the image of the styled room. Accordingly, it can be assumed that the positively associated item is closer to an unknown target item than is the negatively associated item, the unknown target item representing the item in the catalog that should be recommended with respect to the similarity factor. Thus, a probability of the occurrence of such a pair given a certain target item can be calculated using the feature vectors of the pairs of items and the target item.

Similarly, with respect to the style factor, the data may include one or more style-based pairs of items in which one item in the pair is identified as being positively associated with the style preference and the other item in the pair is identified as being negatively associated with the style preference. For example, if the style preference is "modern", then an item classified as "modern" may be designated as the positively associated item and an item classified as "traditional" may be designated as the negatively associated item. Thus, it can be assumed that the positively associated item is closer to an unknown target item than is the negatively associated item, the unknown target item representing the item that should be recommended with respect to the style factor. Thus, a probability of the occurrence of such a pair given a certain target item can be calculated using the feature vectors of the pairs of items and the target item.

For the interaction factors, the data may include one or more interaction-based pairs of items in which one item is identified as being positively associated with user preference based on the user's interaction or lack of interaction with that item and the other item in the pair is identified as being negatively associated with user preference based on the user's interaction or lack of interaction. For example, an item that the user clicked into or "liked" may be considered positively associated while an item that the user deleted or scrolled past may be considered negatively associated. Thus, it can be assumed that the positively associated item is closer to an unknown target item than is the negatively associated item, the unknown target item representing the item that should be recommended with respect to the interaction factor. Thus, a probability of the occurrence of such a pair given a certain target item can be calculated using the feature vectors of the pairs of items and the target item.

Thus, given a certain item in the electronic catalog as the target item, the probability of the occurrence of the similarity-based pair, the probability of the occurrence of the style-based pair, and the probability of the occurrence of the similarity-based pair can be summed together, in which the summation represents how well that item fits as the target item based on all the pairs. Thus, items in the catalog can be ranked based on how well the items fit as the target item, and the recommended item can be selected based on this ranking. Furthermore, as previously described, the different factors (e.g., similarity, style, interaction) may be weighted in calculating the summation, and the specific weights can be experimented with and selected optimizing for various metrics, such as sales, engagement, among others. Specifically, for example, the factors may be weighted by applying the weights, respectively, to the probability of the occurrence of the similarity-based pair, the probability of the occurrence of the style-based pair, and the probability of the occurrence of the interaction-based pair. In various embodiments, there may be other types of factors in place of or in addition to similarity, style, and interaction.

Figure 4:
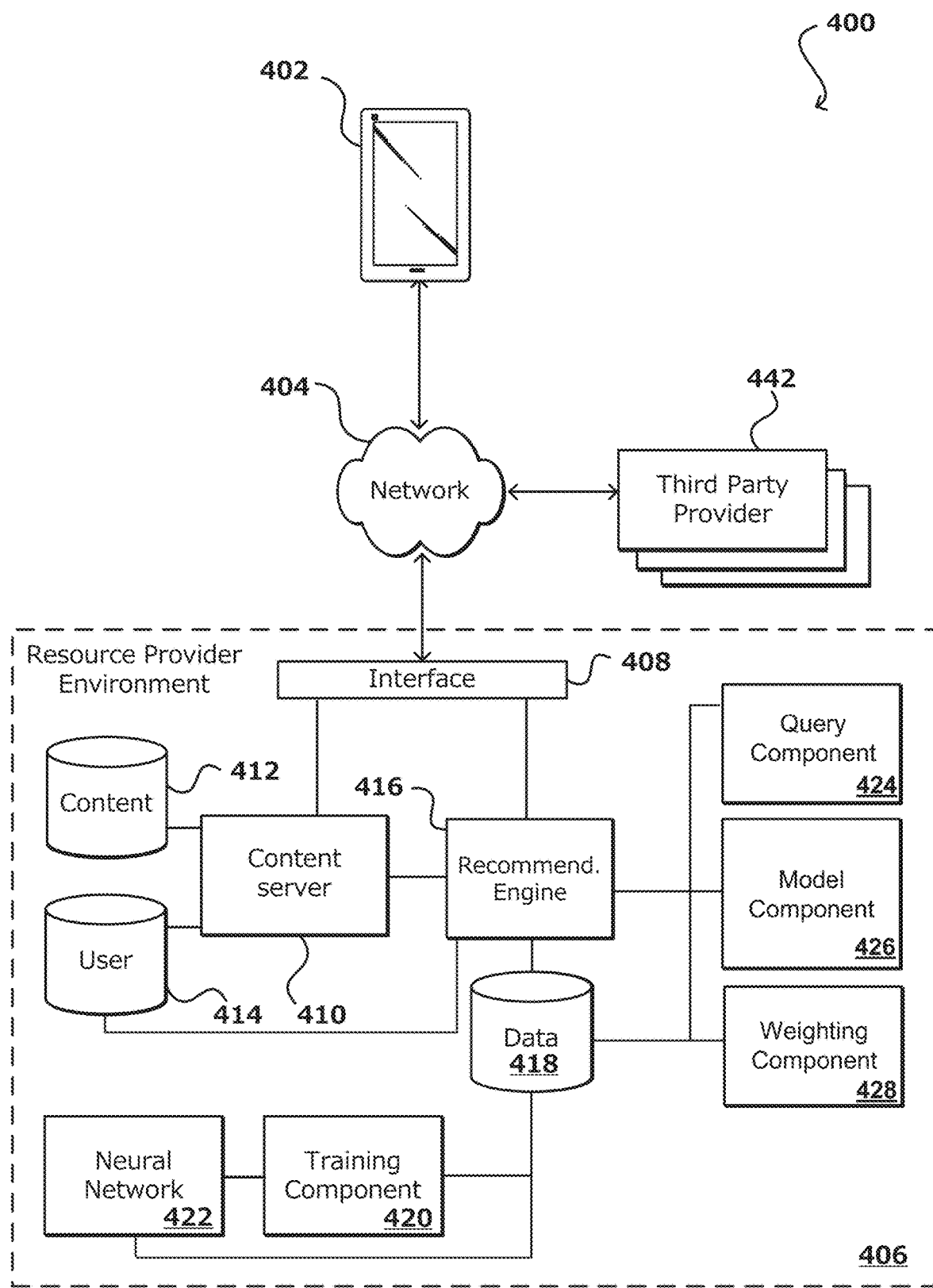
FIG. 4 illustrates an example environment in which aspects of the various embodiments can be implemented, in accordance with various embodiments of the present disclosure.

FIG. 4 illustrates an example environment 400 in which aspects of the various embodiments can be implemented. Specifically, the example environment 400 includes a recommendation engine that can recommend items in an electronic catalog or other database based on visual compatibility with a query object. In this example, a computing device 402 is able to make a call or request across one or more networks 404 to a content provider environment 406. The network(s) can include any appropriate network, such as the Internet, a local area network (LAN), a cellular network, an Ethernet, or other such wired and/or wireless network. The content provider environment 406 can include any appropriate resources for providing content from a resource provider, as may include various servers, data stores, and other such components known or used for providing content from across a network (or from the "cloud").

In this example, a request received to the content provider environment 406 can be received by an interface layer 408 of the environment. As known for network environments, the interface layer can include components such as interfaces (e.g., APIs), load balancers, request and/or data routers, and the like. If the request is a request for content, such as for content for a page to be displayed in an application, information for the request can be directed to one or more content managers 410 and/or content servers, which can obtain the content from a content data store 414 or other such repository to be sent back across the network(s) to the computing device. In some embodiments, information for the request might also be compared against user data in a user data store 412 or other such location do determine, for example, whether the user has access rights to that content. In some embodiments user data might also be analyzed to determine which type of content to provide additional supplemental content to provide with the primary content, and the like.

In various embodiments, visually compatible item recommendations may be determined by a recommendation engine 416 and provider by the content server 410 based upon data stored in the data repository 418 or determined using a query component 424 or model component 426, among other such options. In some embodiments the recommendation engine 416 may access a weighting component 428 or other such mechanism to weigh the data, such as various components of training data, in determining the visually compatible item recommendations. In various embodiments, determining the visually compatible item recommendation may include ranking a plurality of item, in which all or a subset of the plurality of items are assigned a match score indicating how well matched (i.e., strongly associated) the respective item is with respect to an example feature vector. A recommended visually compatible item may be an item whose match score is higher than a threshold score or ranked within a certain number of positions. The individual match scores of the recommended visually compatible item can be determined at least in part using neural networks 522 such as a CNN through training on an appropriate data set. The training component 420 can perform the training on the models and provide the resulting results and/or trained models for use in determining the individual match scores or the recommended products. The training component 420 can be the same system or service that is used to train a localizer, as well as various face detectors or other models, networks, or algorithms discussed or suggested herein.

In the example shown in FIG. 4, a neural network 422 such as a convolutional neural network (CNN) can be trained using, for example, relevant training data, such as annotated images. As mentioned, for CNN-based approaches there can be pairs of images submitted that are classified by a type of attribute (e.g., an association with a certain product), while for GAN-based approaches a series of images may be submitted for training that may include metadata or other information useful in classifying one or more aspects of each image. For example, a CNN may be trained to perform object recognition using images of different types of objects, and then learn how the attributes relate to those objects using the provided training data. In certain embodiments, training a neural network may involve significant use of computation resources and time, such that this may correspond to a preparatory step to servicing search requests and/or performed relatively infrequently with respect to search request servicing and/or according to a schedule. According to some embodiments, training data and respective can be located in a data store 418. A training component 420 can utilize the training data set to train the neural network 422.

As further described, neural networks can include several learning layers in their architecture. A query image from the training data set is analyzed using the neural network to extract a feature vector from the network before the classification layer. This feature vector describes the content of the training data. This process can be implemented for each piece of training data in the data set, and the resulting object feature vectors can be stored in a data store. In various embodiments, the resulting object feature vectors can be compressed for improved processing. For example, the object feature vectors generated by the neural network may include object feature vectors that have a large number of dimensions. The dimensions of these object feature vectors can be reduced by applying at least one of Principal Component Analysis (PCA) or Multi-Dimensional Scaling (MDS). Advantageously, such an approach can reduce storage demands and significantly improve latency performance. Additionally, such an approach can remove or at least reduce noise in the transformed space since the tailing dimensions generally correspond to noise and discarding them helps to focus on the useful signal when measuring similarities.

The initial query image in some embodiments may be received from client device 402 over network 404 and processed by query component 424. In some embodiments, the query image can be received when a selection of an image from a third party provider 432 or content provider environment 406 is selected, such as through the selection of a content item. When a query image is received, for example, a set of query object descriptors may be obtained or determined for the query image. For example, if the query image is not part of an electronic catalog and does not already have associated feature descriptors, the system may generate feature descriptors (both local feature descriptors and object feature descriptors) for the query content in a same and/or similar manner that the feature descriptors are generated for the collection of images, as described. Also, for example, if the query image is part of the collection then the feature descriptors for the query image may be obtained from the appropriate data store. Additionally, the query image can be analyzed to determine local feature descriptors for the query image. Using the clustered feature vectors and corresponding visual words determined for the training images, a histogram for the query image can be determined. The query image can also be analyzed using the neural network 422 to extract a feature vector from the network before the classification layer. This feature vector describes the subject and/or objects shown in the image. Using the local feature descriptors and object feature descriptors, visually similar images (i.e., image data representing facial features of various other uses) and their values of associations with one or more products in content provider environment 406 can be identified.

Figure 5:
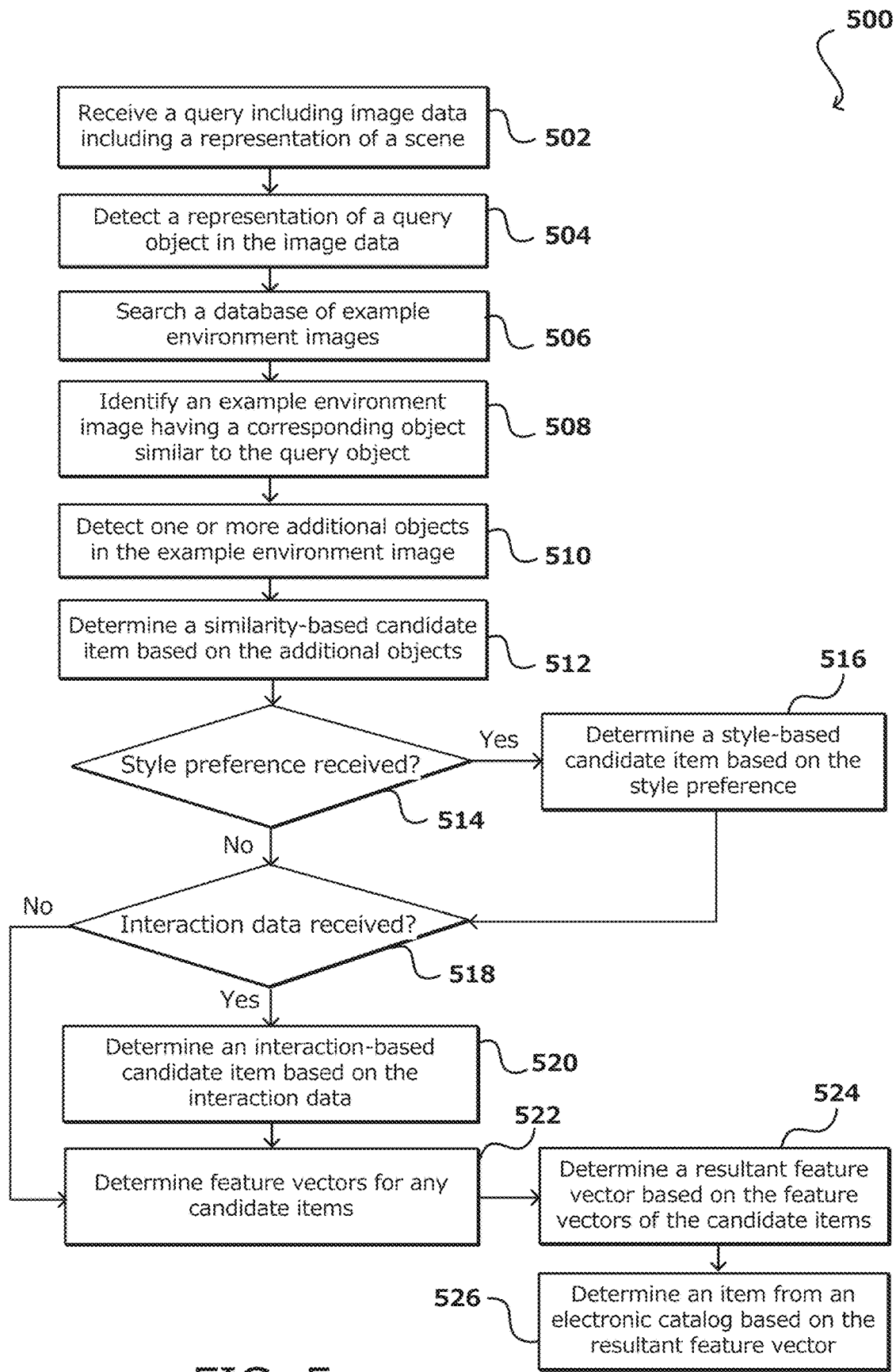
FIG. 5 illustrates an example process of recommending items based on objects detected in an image, in accordance with various embodiments of the present disclosure.

FIG. 5 illustrates an example process 500 of recommending items based on objects detected in an image, in accordance with various embodiments. It should be understood that, for any process discussed herein, there can be additional, fewer, or alternative steps performed in similar or alternative orders, or in parallel, within the scope of the various embodiments. In this example, a query may be received 502 from a client device. The query may include image data from a live camera view of a physical environment comprising a query object captured using a camera of the client device. A representation of the query object, such as a feature vector, may be detected 504 in the image data. A database of example environment images may be searched 506 using the representation of the query object. An example environment image may be identified 508 from the data. The example environment image may include a representation of a corresponding object having a certain degree of visual similarity as the query object. Representations of one or more additional objects in the example image may be detected 510. A similarity-based candidate item may be determined 512 from an electronic catalog based on based at least in part on the measure of similarity between an image of the one or more additional objects and an image of the similarity-based candidate item. It may be determined 514 whether a style preference is received, such as via a user input. If a style preference is received, then a style-based candidate item may be determined 516 from the electronic catalog based at least in part on the style preference. It may also be determined 518 whether one or more user interactions has been received. If a user interaction has been received, then an interaction-based candidate item may be determined 520 based at least in part on the one or more user interactions. Respective feature vectors may then be determined 522 for the candidate items.

A resultant feature vector can be determined 524 based on the feature vectors of the candidate items. In some embodiments, the resultant feature vector can be determined based a weighted combination of the candidate feature vectors, in which respect weights are applied to the candidate feature vectors. A recommended item can be determined 524 based at least in part on a measure of visual similarity between a feature vector of the recommended item and the resultant feature vector. In some embodiments, the weights of the candidate feature vectors may be chosen to optimize for a metric such as sales data. For example, a plurality of different sets of weights may be applied to the feature vectors at different times, respective sales data associated with the plurality of different sets of weights may be obtained, and an optimal set of weights may be determined based at least in part on the sales data.

Figure 6:
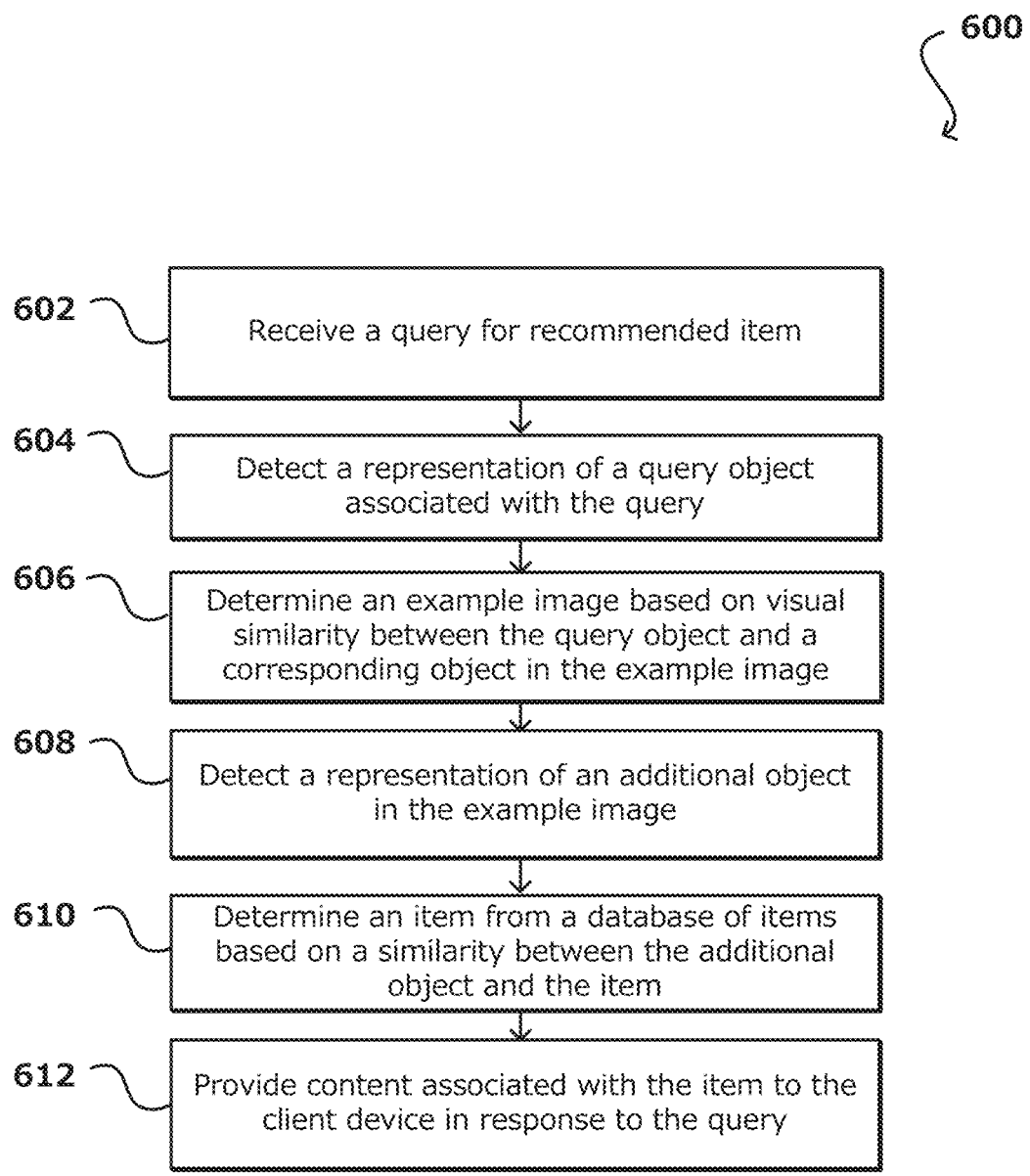
FIG. 6 illustrates an example process of determining aesthetically compatible items based on example collections, in accordance with various embodiments of the present disclosure.

FIG. 6 illustrates an example process 600 of determining aesthetically compatible items based on example collections, in accordance with various embodiments. In this example, a query is received 602 from a client device. A representation of a query object associated with the query may be detected 604. In some embodiments, the query may include an image or live camera view capture by the client device and from which the query object is extracted. In some embodiments, instead of providing an image or live camera view, the user may select an existing image or catalog item as the query object. An example image may be determined 606 from a database of example images based on a measure of similarity between the representation of the query object and a representation of a corresponding object in the example image. A representation of an additional object in the example image may be detected 608. An item may be determined 610 from a database of items based at least in part on a measure of similarity between the representation of the additional object and a representation of the item. Thus, content associated with the item can be provided 612 to the client device in response to the query. In some embodiments, an image or live camera view of the scene may be displayed on a display of the client device, and an augmented reality representation of the item may be superimposed onto the scene on the display. In some embodiments, a user input including a style preference may be received and the item may be determined based at least in part on the style preference. The item, the example image, or both, may be associated with a style attribute corresponding to the style preference. In some embodiments, a one or more interactions associated with one or more previously presented items may be received, and the item may be determined based at least in part on the one or more user interactions. For example, the one or more interactions correspond to at least one of a positive user feedback or a negative user feedback with respect to at the one or more previously presented items.

In some embodiments, a similarity-based candidate item may be determined based at least in part on the measure of similarity between the representation of the additional object and a representation of the item, a style-based candidate item may be determined based at least in part on the style preference. Respective feature vectors associated with the similarity-based candidate item and the style-based candidate item may be determined. Respective weights may be applied to the feature vectors, and a resultant feature vector may be generated based on a weighted combination of the feature vectors. Thus, the item may be determined based at least in part on a measure of similarity between a feature vector representing the item and the resultant feature vector. In some embodiment, an interaction-based candidate item may be determined based at least in part on the one or more user interactions. Accordingly, the feature vectors used in generating the resultant feature vector includes a feature vector associated with the interaction-based candidate item and a respectively assigned weight. In some embodiments, the values of the respective weights may be determined by applying a first set of respective weights to the feature vectors, determining a first value of the user engagement metric associated with the first set of respective weights, applying a second set of respective weights to the feature vectors, and determining a second value of the user engagement metric associated with the second set of respective weights.

In some embodiments, a plurality of candidate items may be determined from the database of items respectively corresponding to a plurality of different item types, such as furniture or decor categories (e.g., sofa, table, vase, bed, comforter, chair), and content associated with the plurality of candidate items may be provide to the client device in response to the query. In some embodiments, a user may want to see other items. Thus, when such an input is received for alternate items, one or more additional candidate items may be determined from the database, and at least a subset of the plurality of candidate items may be replaced with the one or more additional candidate items from the database.

Figure 7:
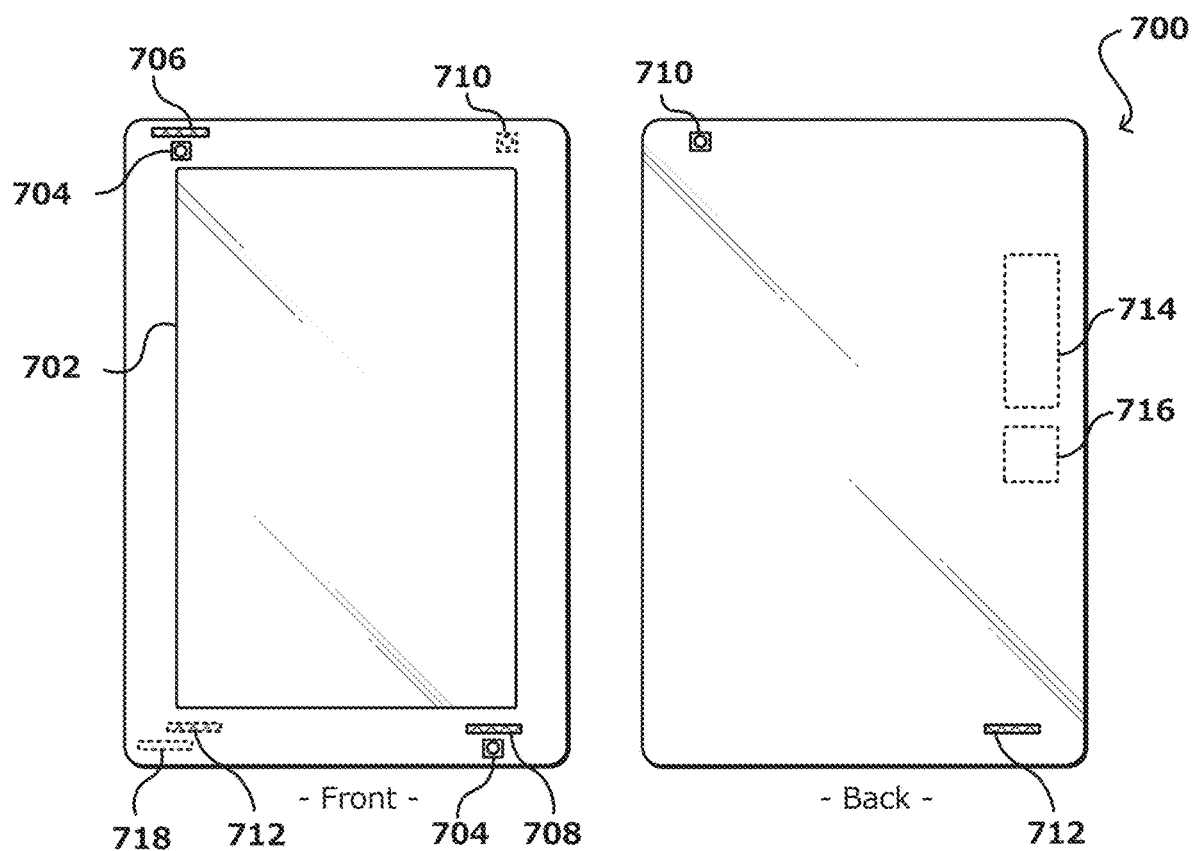
FIG. 7 illustrates an example computing device that can be used, in accordance with various embodiments of the present disclosure.

FIG. 7 illustrates an example computing device 700 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others. In this example, the computing device 700 has a display screen 702, which under normal operation will display information to a user facing the display screen (e.g., on the same side of the computing device as the display screen). The computing device in this example can include one or more media capture elements, in this example including one image capture element 704 on the back side of the device, although it should be understood that image capture elements could also, or alternatively, be placed on the sides or corners of the device, and that there can be any appropriate number of capture elements of similar or different types. Each image capture element 704 may be, for example, a camera, a charge-coupled device (CCD), a motion detection sensor, or an infrared sensor, or can utilize any other appropriate image capturing technology. The computing device can also include at least one microphone or other audio capture element(s) capable of capturing other types of input data, as known in the art, and can include at least one orientation-determining element that can be used to detect changes in position and/or orientation of the device. Various other types of input can be utilized as well as known in the art for use with such devices.

Figure 8:
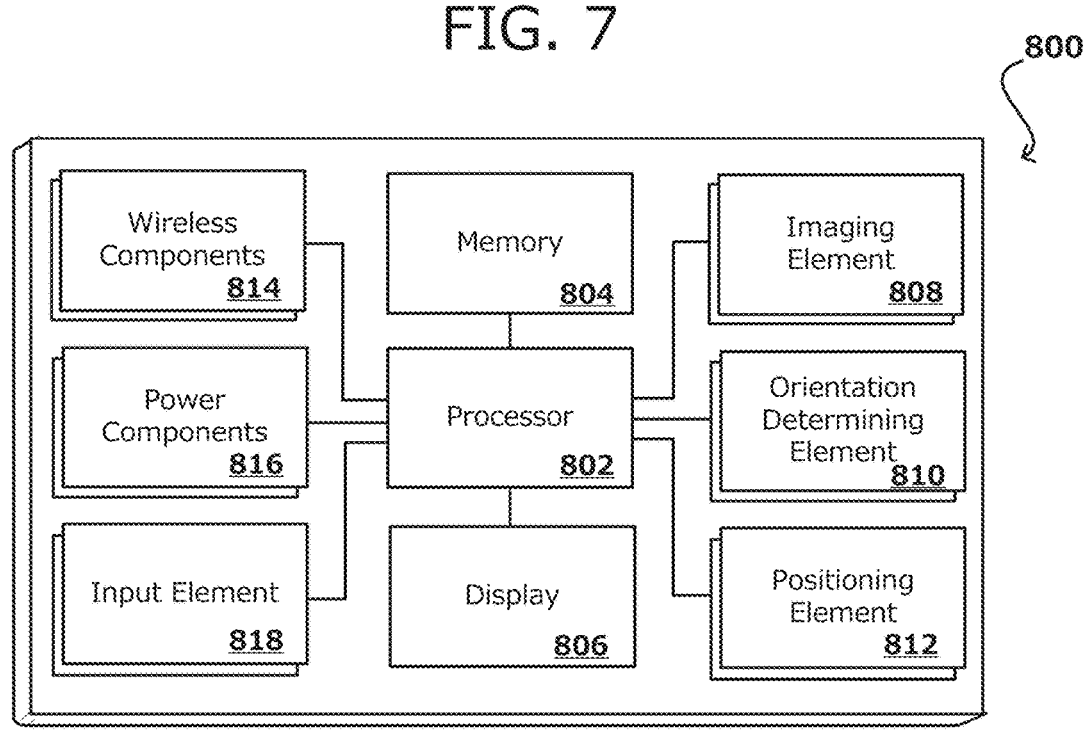
FIG. 8 illustrates a set of example components of one or more devices of the present disclosure, in accordance with various embodiments of the present disclosure.

FIG. 8 illustrates a set of example components of one or more devices 800 of the present disclosure. In this example, the device includes at least one processor 802 for executing instructions that can be stored in a memory device or element 804. As would be apparent to one of ordinary skill in the art, the device can include many types of memory, data storage or computer-readable media, such as a first data storage for program instructions for execution by the processor 802, the same or separate storage can be used for images or data, a removable memory can be available for sharing information with other devices, and any number of communication approaches can be available for sharing with other devices. The device typically will include some type of display element 806, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 808, such as at least one ambient light camera that is able to image a user, people, or objects in the vicinity of the device. An image capture element can include any appropriate technology, such as a CCD image capture element having a sufficient resolution, focal range and viewable area, to capture an image of the user when the user is operating the device. Methods for capturing images or video using an image capture element with a computing device are well known in the art and will not be discussed herein in detail. It should be understood that image capture can be performed using a single image, multiple images, periodic imaging, continuous image capturing, image streaming, etc.

The device can include one or more networking components 810 enabling the device to communicate with remote systems or services such as content providers and rights determining systems. These components can include, for example, wired or wireless communication components operable to communicate over a network such as a cellular network, local area network, or the Internet. The device can also include at least one additional input device 812 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device. As discussed, different approaches can be implemented in various environments in accordance with the described embodiments.

Figure 9:
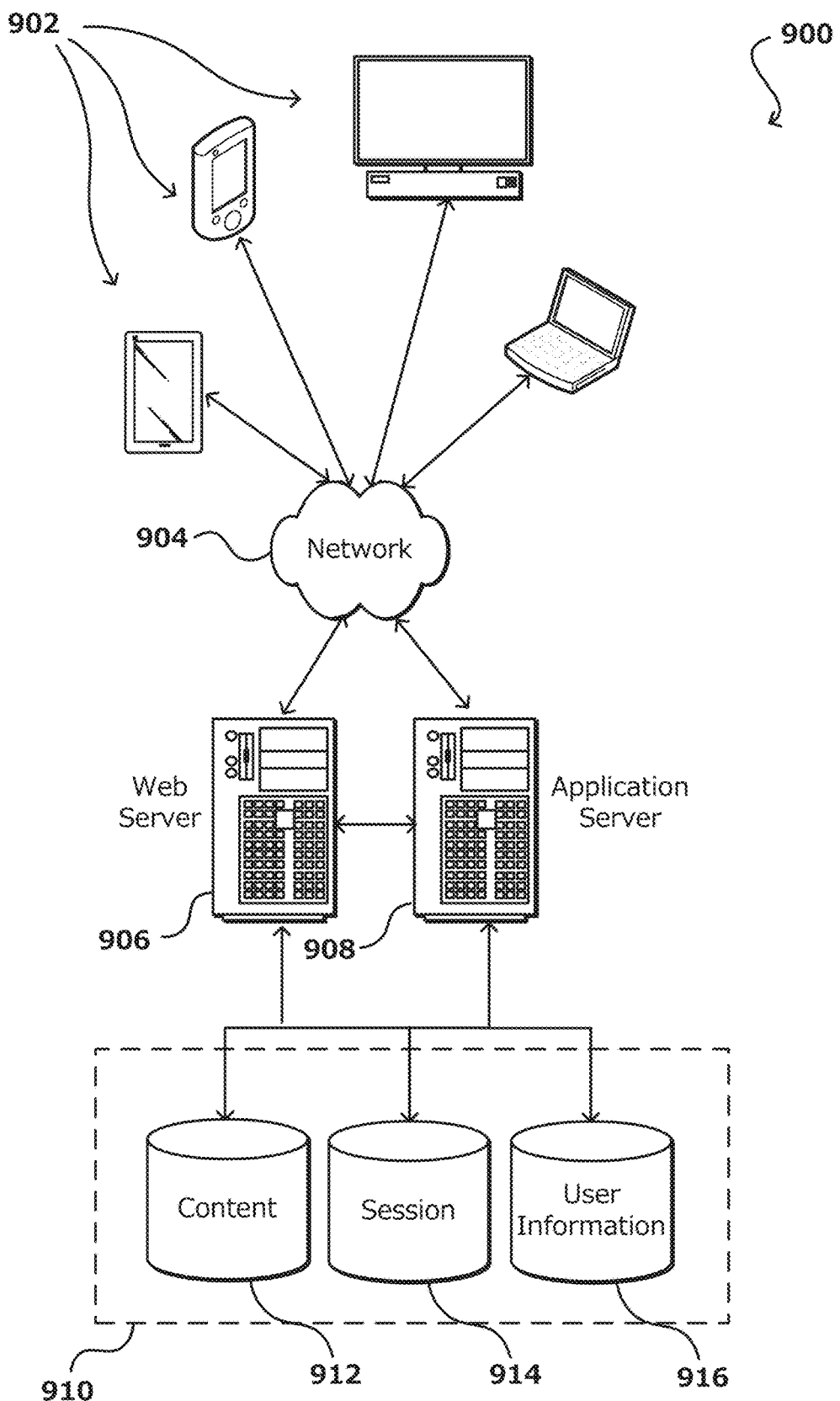
FIG. 9 illustrates an example environment for implementing aspects, in accordance with various embodiments of the present disclosure.

FIG. 9 illustrates an example environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term data "store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein. The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser. Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management.

These devices can also include other electronic devices, such as dummy terminals, thin-clients, gaming systems and other devices capable of communicating via a network. Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof. In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc. Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information.

The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
receiving, at a search engine for an electronic marketplace, a query from a client device, the query including an image of a query object;
detecting a representation of the query object;
determining an example image from a database of example images based on a measure of similarity between the representation of the query object and a representation of a corresponding object in the example image;
detecting a representation of an additional object in the example image;

determining a similarity-based candidate item based at least in part on a measure of similarity between the representation of the additional object and a representation of the item;

receiving a user input including a style preference;

determining a style-based candidate item based at least in part on the style preference;

determining respective feature vectors associated with the similarity-based candidate item and the style-based candidate item;

applying respective weights to the feature vectors;

generating a resultant feature vector based on a weighted combination of the feature vectors;

determining an item from a database of items based at least in part on a measure of similarity between a feature vector representing the item and the resultant feature vector; and providing content associated with the item to the client device in response to the query received at the search engine.

2. The method of claim 1, wherein at least one of the item, the example image, the corresponding object, or the additional object is associated with a style attribute corresponding to the style preference.

3. The method of claim 1, further comprising:

receiving one or more interactions associated with one or more previously presented items; and determining the item based at least in part on the one or more user interactions.

4. The method of claim 3, wherein the one or more interactions correspond to at least one of a positive user feedback or a negative user feedback with respect to at the one or more previously presented items.

5. The method of claim 1, further comprising: receiving one or more interactions associated with one or more previously presented items; and determining an interaction-based candidate item based at least in part on the one or more user interactions, wherein the feature vectors includes a feature vector associated with the interaction-based candidate item.

6. The method of claim 5, further comprising:

determining values of the respective weights optimizing for a user engagement metric.

7. The method of claim 6, wherein determining values of the respective weights further includes:

applying a first set of respective weights to the feature vectors;

determining a first value of the user engagement metric associated with the first set of respective weights;

applying a second set of respective weights to the feature vectors; and determining a second value of the user engagement metric associated with the second set of respective weights.

8. The method of claim 1, further comprising:

determining a plurality of candidate items from the database of items respectively corresponding to a plurality of different item types; and providing content associated with the plurality of candidate items to the client device in response to the query.

9. The method of claim 8, further comprising:

receiving a user input for alternate items;

determining one or more additional candidate items from the database; and replacing at least a subset of the plurality of candidate items with the one or more additional candidate items from the database.

10. The method of claim 1, further comprising:

displaying an image or live camera view of a scene associated with the query on a display of the client device; and displaying an augmented reality representation of the item superimposed onto the scene on the display.

11. A system, comprising:

at least one computing device processor; and a memory device including instructions that, when executed by the at least one computing device processor, cause the system to:

receive, at a search engine for an electronic marketplace, a query from a client device, the query including an image of a query object;

detect a representation of a query object associated with the query;

determine an example image from a database of example images based on a measure of similarity between the representation of the query object and a representation of a corresponding object in the example image;

detect a representation of an additional object in the example image;

determine a similarity-based candidate item based at least in part on a measure of similarity between the representation of the additional object and a representation of the item;

receive a user input including a style preference;

determine a style-based candidate item based at least in part on the style preference;

determine respective feature vectors associated with the similarity-based candidate item and the style-based candidate item;

apply respective weights to the feature vectors;

generate a resultant feature vector based on a weighted combination of the feature vectors;

determine an item from a database of items based at least in part on a measure of similarity between a feature vector representing the item and the resultant feature vector; and provide content associated with the item to the client device in response to the query received at the search engine.

12. The system of claim 11, wherein the instructions when executed further cause the system to: receive one or more interactions associated with one or more previously presented items; and determine an interaction-based candidate item based at least in part on the one or more user interactions, wherein the feature vectors includes a feature vector associated with the interaction-based candidate item.

13. The system of claim 12, wherein the instructions when executed further cause the system to:

determine values of the respective weights optimizing for a user engagement metric.

14. The system of claim 11, wherein the instructions when executed further cause the system to:

determine a plurality of candidate items from the database of items respectively corresponding to a plurality of different item types; and provide content associated with the plurality of candidate items to the client device in response to the query.

15. The system of claim 14, wherein the instructions when executed further cause the system to:
- receive a user input for alternate items;
- determine one or more additional candidate items from the database; and
- replace at least a subset of the plurality of candidate items with the one or more additional candidate items from the database.

16. The system of claim 11, wherein the instructions when executed further cause the system to:
- display an image or live camera view of a scene associated with the query on a display of the client device; and
- display an augmented reality representation of the item superimposed onto the scene on the display.

17. A non-transitory computer-readable storage medium including instructions that, when executed by at least one processor of a computing system, cause the computing system to:
- receive, at a search engine for an electronic marketplace, a query from a client device, the query including an image of a query object;
- detect a representation of a query object associated with the query;
- determine an example image from a database of example images based on a measure of similarity between the representation of the query object and a representation of a corresponding object in the example image;
- detect a representation of an additional object in the example image;
- determine a similarity-based candidate item based at least in part on a measure of similarity between the representation of the additional object and a representation of the item;
- receive a user input including a style preference;
- determine a style-based candidate item based at least in part on the style preference;
- determine respective feature vectors associated with the similarity-based candidate item and the style-based candidate item;
- apply respective weights to the feature vectors;
- generate a resultant feature vector based on a weighted combination of the feature vectors;
- determine an item from a database of items based at least in part on a measure of similarity between a feature vector representing the item and the resultant feature vector; and
- provide content associated with the item to the client device in response to the query received at the search engine.

18. The non-transitory computer-readable storage medium of claim 17, wherein the instructions when executed further cause the system to:
- receive one or more interactions associated with one or more previously presented items; and
- determine the item based at least in part on the one or more user interactions.

19. The non-transitory computer-readable storage medium of claim 17, wherein the instructions when executed further cause the system to:
- display an image or live camera view of a scene associated with the query on a display of the client device; and
- display an augmented reality representation of the item superimposed onto the scene on the display.

20. The non-transitory computer-readable storage medium of claim 19, wherein the instructions when executed further cause the system to:
- determine a plurality of candidate items from the database of items respectively corresponding to a plurality of different item types;
- provide content associated with the plurality of candidate items to the client device in response to the query
- receive a user input for alternate items;
- determine one or more additional candidate items from the database; and
- replace at least a subset of the plurality of candidate items with the one or more additional candidate items from the database.

* * * * *